(12) United States Patent
Kuwahara et al.

(10) Patent No.: US 10,693,505 B2
(45) Date of Patent: Jun. 23, 2020

(54) SIGNAL TRANSMISSION APPARATUS

(71) Applicant: MITSUBISHI ELECTRIC CORPORATION, Tokyo (JP)

(72) Inventors: Takashi Kuwahara, Tokyo (JP); Yoshihiro Akeboshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/489,543

(22) PCT Filed: Mar. 21, 2017

(86) PCT No.: PCT/JP2017/011167
§ 371 (c)(1),
(2) Date: Aug. 28, 2019

(87) PCT Pub. No.: WO2018/173111
PCT Pub. Date: Sep. 27, 2018

(65) Prior Publication Data
US 2020/0052725 A1    Feb. 13, 2020

(51) Int. Cl.
*H04B 3/00*   (2006.01)
*H04B 1/00*   (2006.01)
*H04B 1/02*   (2006.01)

(52) U.S. Cl.
CPC ............. *H04B 1/0028* (2013.01); *H04B 1/02* (2013.01)

(58) Field of Classification Search
CPC .......... H04B 1/0028; H04B 1/02; H04L 5/20; H04L 7/0008; H04L 25/0266; H04L 5/023; H03K 5/003
(Continued)

(56) References Cited

U.S. PATENT DOCUMENTS 5,901,151 A     5/1999   Bleiweiss et al.
6,507,608 B1 *  1/2003   Norrell ................... H04L 5/023
                                                              370/200
(Continued)

FOREIGN PATENT DOCUMENTS

DE     69730593 T2    10/2005
JP     2006-229503 A   8/2006
(Continued)

OTHER PUBLICATIONS

International Search Report (PCT/ISA/210) issued in PCT/JP2017/011167, dated Jun. 13, 2017.
(Continued)

*Primary Examiner* — Phuong Phu
(74) *Attorney, Agent, or Firm* — Birch, Stewart, Kolasch & Birch, LLP.

(57) ABSTRACT

A sending unit includes a send data storing unit, a sending-side signal processing unit, and a first DA converter and a second DA converter. A receiving unit includes a first AD converter and a second AD converter, a receiving-side signal processing unit, and a receive data storing unit. The sending-side signal processing unit calculates output signals using a matrix formed of eigenvectors corresponding to transmission eigenmodes in which the signals propagate through a transmission path. The receiving-side signal processing unit calculates data signals of a plurality of sequences by the inverse of the matrix used by the sending-side signal processing unit.

4 Claims, 11 Drawing Sheets

(58) Field of Classification Search
USPC ........ 375/257, 258, 219, 220, 295, 316, 346
See application file for complete search history.

(56) References Cited

U.S. PATENT DOCUMENTS

| | | | | |
|---|---|---|---|---|
| 8,159,274 | B2* | 4/2012 | Lin | H04L 7/0008 |
| | | | | 327/108 |
| 8,279,976 | B2* | 10/2012 | Lin | H04L 5/20 |
| | | | | 375/222 |
| 8,705,637 | B2* | 4/2014 | Shibata | H04L 25/0266 |
| | | | | 327/108 |
| 9,124,429 | B2* | 9/2015 | Moons | H04L 5/20 |
| 2003/0201802 | A1* | 10/2003 | Young | H04L 5/20 |
| | | | | 327/108 |
| 2004/0239374 | A1* | 12/2004 | Hori | H03K 5/003 |
| | | | | 327/65 |
| 2006/0268966 | A1* | 11/2006 | Cioffi | H04L 5/20 |
| | | | | 375/222 |
| 2011/0293041 | A1* | 12/2011 | Luo | H04L 5/20 |
| | | | | 375/316 |
| 2013/0114657 | A1 | 5/2013 | Shibata et al. | |
| 2013/1016232 | | 6/2013 | Van Den Berg et al. | |
| 2013/0223293 | A1 | 8/2013 | Jones et al. | |
| 2015/0270872 | A1 | 9/2015 | Zhang et al. | |

FOREIGN PATENT DOCUMENTS

| | | |
|---|---|---|
| JP | 2007-68169 A | 3/2007 |
| JP | 2013-542635 A | 11/2013 |
| JP | 2015-508969 A | 3/2015 |
| JP | 2015-531565 A | 11/2015 |
| WO | WO 2012/114672 A1 | 8/2012 |

OTHER PUBLICATIONS

Nakazawa et al., "On the Computational Complexity of MIMO Processing in Mode Division Multiplexing Transmission over 2-mode Fiber", IEICE Technical Report, OCS 2012-36, Aug. 23, 2012, vol. 112, No. 193, pp. 43-48.

German Office Action for German Application No. 112017007088.0, dated Apr. 1, 2020, with English translation.

* cited by examiner

SIGNAL TRANSMISSION APPARATUS

TECHNICAL FIELD

The present invention relates to a signal transmission apparatus that can suppress the influence of signal interference such as crosstalk even in adjacent signal lines upon performing high-speed metal line signal transmission using a printed circuit board, a cable, etc.

BACKGROUND ART

Conventionally, as a method of increasing the amount of data transmitted without increasing the number of signal lines, there is a technique in which other data signals are superimposed on a pair of two differential signal lines. As such a technique, there is, for example, a signal transmission apparatus in which two common-mode filters are provided to respective two signal lines of a pair included in a differential transmission path, by which single-ended mode signals of two channels are superimposed on each other using two signal lines that transmit a pair of differential signal lines (see, for example, Patent Literature 1).

CITATION LIST

Patent Literature

Patent Literature 1: WO 2012/114672 A

SUMMARY OF INVENTION

Technical Problem

However, the conventional signal transmission apparatus has a problem that signal interference caused by crosstalk occurs between adjacent signal wiring lines, causing quality degradation such as communication error. Alternatively, to suppress signal interference, space needs to be secured between the signal wiring lines, and it is difficult to provide high-density wiring lines to satisfy such a requirement, causing a problem of an increase in device size.

The invention is made to solve such problems, and an object of the invention is to provide a signal transmission apparatus that can suppress the influence of signal interference such as crosstalk even if the space between signal wiring lines is narrowed, and can therefore achieve miniaturization while maintaining quality.

Solution to Problem

A signal transmission apparatus according to the invention includes a sending unit including: a sending-side signal processing unit to perform numerical value computation of data signals of a plurality of sequences; and DA converters to convert the signals outputted from the sending-side signal processing unit to analog signals and sending out the analog signals to a transmission path formed of a plurality of conductors, a number of the DA converters being equal to a number of the data signals of a plurality of sequences; and a receiving unit including: AD converters to convert the signals received through the transmission path to digital signals, a number of the AD converters being equal to a number of the sequences of the data signals in the sending-side signal processing unit; and a receiving-side signal processing unit to instruct the data signals of a plurality of sequences from the signals outputted from the AD converters, and the sending-side signal processing unit calculates output signals using a matrix formed of eigenvectors corresponding to transmission eigenmodes in which the signals propagate through the transmission path, and the receiving-side signal processing unit calculates the data signals of a plurality of sequences by inverse of the matrix used by the sending-side signal processing unit, wherein the sending-side signal processing unit multiplies a result of adding together two-sequence data signals by a weight coefficient $(1-\alpha)$ and allows a resultant as one output data, and multiplies a result of subtracting the data signals from each other by a weight coefficient $\alpha$ and allows a resultant as other output data, and the receiving-side signal processing unit multiplies the received one output data by a weight coefficient $1/(1-\alpha)$ and multiplies the other output data by a weight coefficient $1/\alpha$, and adds together the one output data and the other output data and allows a resultant to serve as one data signal out of the two-sequence data signals, and subtracts the one output data and the other output data from each other and allows a resultant to serve as an other data signal.

Advantageous Effects of Invention

In the signal transmission apparatus according to the invention, the sending-side signal processing unit calculates output signals using a matrix formed of eigenvectors corresponding to transmission eigenmodes in which the signals propagate through the transmission path, and the receiving-side signal processing unit calculates data signals of a plurality of sequences by the inverse of the matrix used by the sending-side signal processing unit. By this, even if the space between signal wiring lines is narrowed, the influence of signal interference such as crosstalk can be suppressed, and as a result, miniaturization of the signal transmission apparatus can be achieved while quality is maintained.

DESCRIPTION OF EMBODIMENTS

To describe the invention in more detail, modes for carrying out the invention will be described hereinafter with reference to the accompanying drawings.

First Embodiment

Figure 1:
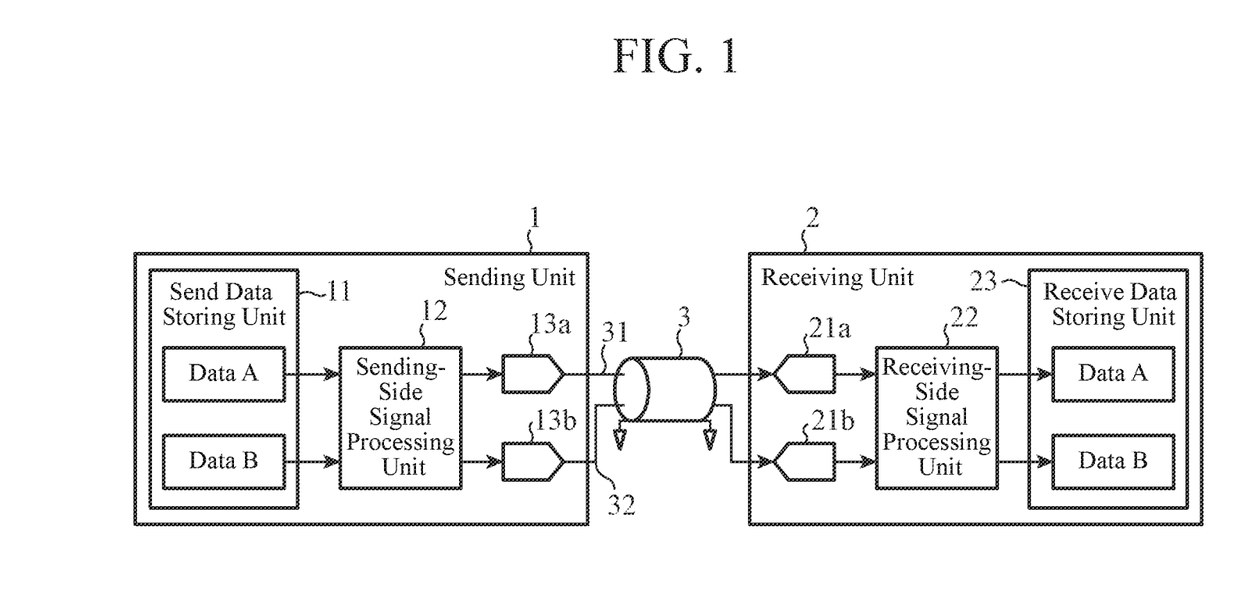
FIG. 1 is a configuration diagram of a signal transmission apparatus according to a first embodiment of the present invention.

FIG. 1 is a configuration diagram showing a signal transmission apparatus of the present embodiment.

In the drawing, the signal transmission apparatus is configured such that a sending unit 1 and a receiving unit 2 are connected to each other by a transmission path 3. The signal transmission apparatus is configured such that the sending unit 1 and the receiving unit 2 can perform various signal processing, and thus, can also perform metal line communication including, for example, analog modulated and demodulated signals such as OFDM signals in addition to digital signals.

First, a configuration of each unit will be described. In FIG. 1, the sending unit 1 includes a send data storing unit 11 that stores send data for communication; a sending-side signal processing unit 12 that converts two-sequence send data to communication signals for a two-channel transmission path; and a first DA converter 13a and a second DA converter 13b that convert digital signal data having been subjected to signal processing by the sending-side signal processing unit 12 to analog signal data to output the analog data to the transmission path 3. Note that in the send data storing unit 11 there are stored single-ended mode signals of two sequences.

The receiving unit 2 includes a first AD converter 21a and a second AD converter 21b that convert input signals from the transmission path 3 to digital signals; a receiving-side signal processing unit 22 that reconstructs the data signals outputted from the first AD converter 21a and the second AD converter 21b to single-ended mode signals of two sequences; and a receive data storing unit 23 that stores the reconstructed data.

The transmission path 3 includes two signal lines 31 and 32 and is, for example, a cable or a circuit board. For example, in a case of a signal transmission apparatus in backplane mode, it can be considered that the sending unit 1 and the receiving unit 2 play a role as daughter cards and the transmission path 3 is wiring lines on a backboard. In addition, the number of signal lines in the transmission path 3 is not limited to two, and in a case of a transmission system with a pair of two signal lines, by increasing the number of transmission paths and DA converters and AD converters on the basis of the number of transmission paths, the present invention can also be applied to multiple pairs.

Figure 2:
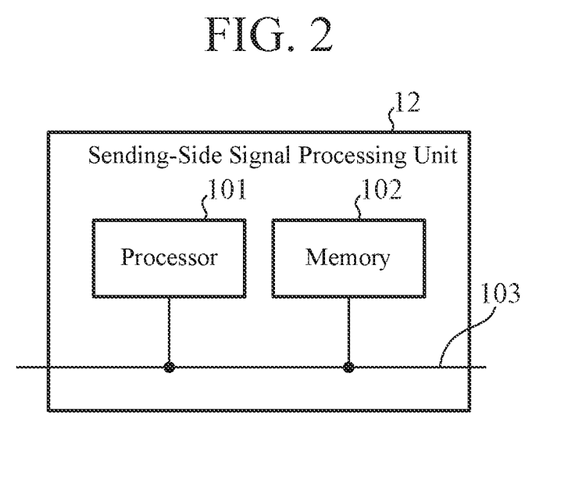
FIG. 2 is a hardware configuration diagram of a sending-side signal processing unit of the signal transmission apparatus according to the first embodiment of the present invention.

FIG. 2 is a hardware configuration diagram of the sending-side signal processing unit 12 and the receiving-side signal processing unit 22. Although FIG. 2 only shows the configuration of the sending-side signal processing unit 12, the receiving-side signal processing unit 22 also has the same configuration. As shown in the drawing, the sending-side signal processing unit 12 includes a processor 101, a memory 102, and a bus 103. The processor 101 is a computing apparatus that implements a function of the sending-side signal processing unit 12 by executing a program for signal processing, and the memory 102 is a storage apparatus that stores the program for signal processing and forms a work area for when the processor 101 executes the program. In addition, the bus 103 is a communication channel that connects the processor 101 to the memory 102 and is used to perform input and output of data with an external source. In addition, the sending-side signal processing unit 12 and the receiving-side signal processing unit 22 may be composed of a field programmable gate array (FPGA).

Figure 3:
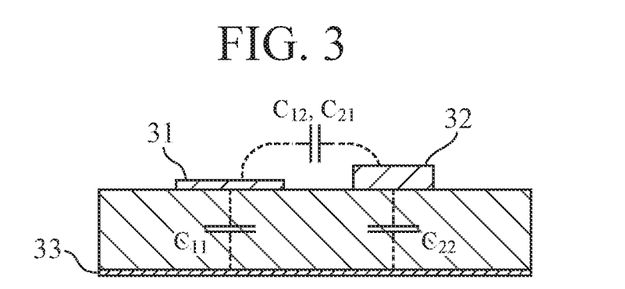
FIG. 3 is an illustrative diagram showing an example of a transmission path of the signal transmission apparatus according to the first embodiment of the present invention.

As an example of the transmission path 3, microstrip lines on a printed circuit board which is a multiconductor transmission path are shown in FIG. 3. In general, a multiconductor transmission path can be modeled as a set of capacitor elements and inductor elements per unit line length. FIG. 3 shows a cross-sectional configuration of wiring lines including two signal lines 31 and 32 and a GND conductor 33. When the capacitor element of each conductor is $C_{ij}$, in this case, $C_{11}$ and $C_{22}$ are GND capacitances of the signal lines 31 and 32 to the GND conductor 33, respectively. In addition, $C_{12}$ and $C_{21}$ are a capacitance between the signal line 31 and the signal line 32.

Likewise, the inductor element of each conductor is $L_{ij}$. Though not shown in FIG. 3, $L_{11}$ and $L_{12}$ are self-inductances of the signal line 31 and the signal line 32, respectively, and furthermore, $L_{12}$ and $L_{21}$ are a mutual inductance between the signal line 31 and the signal line 32.

In the transmission path shown in FIG. 3, a wave equation satisfied by a transmission waveform is represented by:

$$\frac{d^2}{dx^2}[V_i] \propto \{[L_{ij}] \cdot [C_{ij}]\} \cdot [V_i] \qquad \text{(Equation 3)}$$

using the capacitance matrix $$C = \begin{bmatrix} C_{11} & C_{12} \\ C_{21} & C_{22} \end{bmatrix} \qquad \text{(Equation 1)}$$

and the inductance matrix $$L = \begin{bmatrix} L_{11} & L_{12} \\ L_{21} & L_{22} \end{bmatrix}. \qquad \text{(Equation 2)}$$

In general, a matrix of size n is diagonalizable when there are n eigenvectors. By using the eigenvectors (mode signals)

as communication signals for a plurality of signal lines in a transmission path, the matrices $[L_{ij}]\cdot[C_{ij}]$ in the above-described wave equation can be diagonalized. At this time, transmission signals that propagate through the multiconductor transmission path become eigenmodes, enabling to eliminate the influence of signal interference. When a matrix formed of the eigenvectors of the matrices $\{[L_{ij}]\cdot[C_{ij}]\}$ is $[T_{ij}]$, a vector $[V_{mi}]$ of a mode signal that satisfies $$[V_i]=[T_{ij}]\cdot[V_{mi}] \quad \text{(Equation 4)}$$

is obtained.

When the sending unit 1 outputs communication signals $V_i$ (i=1 and 2) to the signal line 31 and the signal line 32, by converting the communication signals $V_i$ to the vectors $V_{mi}$ (i=1 and 2) of the above-described mode signals, the influence of signal interference between the signal lines can be suppressed because $V_{mi}$ are eigenmodes.

Figure 4:
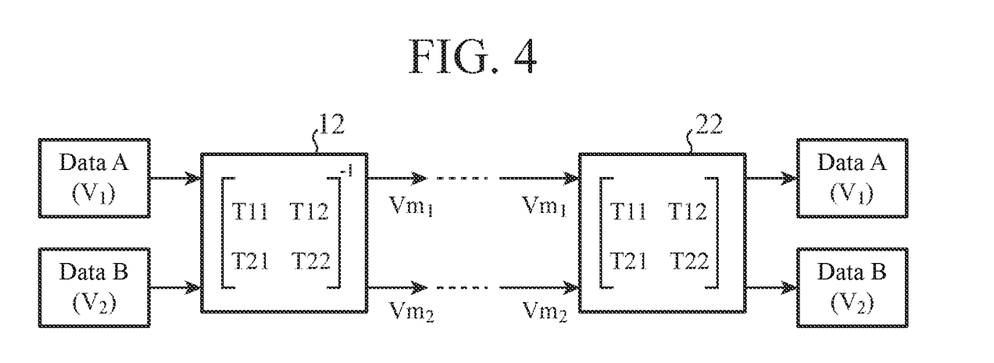
FIG. 4 is an illustrative diagram showing the processing operation of a sending-side signal processing unit and a receiving-side signal processing unit of the signal transmission apparatus according to the first embodiment of the present invention.

FIG. 4 shows the processing operation of the sending-side signal processing unit 12 and the receiving-side signal processing unit 22. When two-channel communication signals $V_i$ (i=1 and 2) are outputted to the signal line 31 and the signal line 32, the sending-side signal processing unit 12 calculates eigenvectors of the matrices $\{[L_{ij}]\cdot[C_{ij}]\}$ for a transmission path structure. By the inverse of the matrix $[T_{ij}]$ formed of the eigenvectors, vectors $V_{mi}$ (i=1 and 2) of mode signals are calculated from the communication signals $V_i$ and outputted to the transmission path 3.

The receiving-side signal processing unit 22 performs an inverse process to that of the sending-side signal processing unit 12, and thereby reconstructs the two-channel communication signals $V_i$ (i=1 and 2).

Next, as an example of a general signal transmission path such as a printed circuit board, a cable, etc., a case is considered in which the transmission path 3 has a transmission structure in which the cross-sectional shapes of the plurality of signal lines 31 and 32 included in the transmission path 3 are identical and have excellent symmetry. When the cross-sectional shapes of the signal line 31 and the signal line 32 are identical, mode signals that propagate through the transmission path have a so-called ODD mode and EVEN mode, and conversion to mode signals corresponding to the modes by the sending-side signal processing unit 12 and the receiving-side signal processing unit 22 becomes very easy. A process performed in this case will be described below.

The send data storing unit 11 in the sending unit 1 of FIG. 1 has different pieces of two-sequence data (data A and data B) stored therein, and the sending-side signal processing unit 12 obtains the data A and the data B. Then, the sending-side signal processing unit 12 performs signal processing to convert the data A and the data B to the EVEN mode and the ODD mode.

Figure 5:
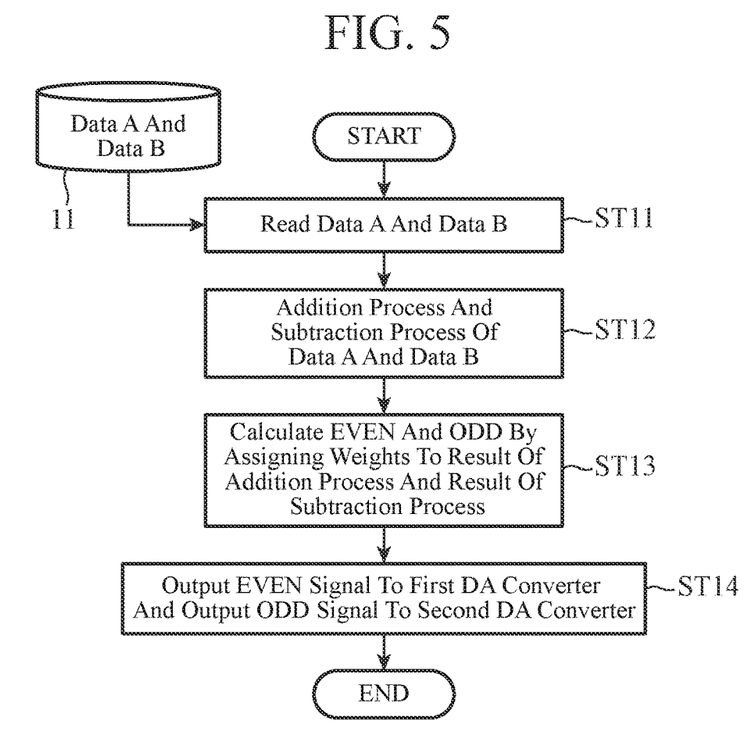
FIG. 5 is an operation flowchart of the sending-side signal processing unit of the signal transmission apparatus according to the first embodiment of the present invention.

An operation flowchart of the sending-side signal processing unit 12 is shown in FIG. 5. Here, in the following conversion equations, the data A in the sending unit 1 is written as "$A_1$", the data B as "$B_1$", ODD-mode data as "$ODD_1$", and EVEN-mode data as "EVENT". In addition, ODD-mode data inputted to the receiving unit 2 is written as "$ODD_2$" and EVEN-mode data as "$EVEN_2$", and of pieces of reconstructed data entering the receive data storing unit 23, a piece of reconstructed data corresponding to $A_1$ is written as "$A_2$" and a piece of reconstructed data corresponding to $B_1$ as "$B_2$".

The sending-side signal processing unit 12 reads the data A and the data B in the send data storing unit 11 (step ST11), and performs an addition process and a subtraction process on the data A and the data B (step ST12) and calculates an EVEN-mode signal and an ODD-mode signal by assigning weights to the results of the addition and subtraction processes (step ST13). For a method of converting the data A and the data B to the EVEN mode and the ODD mode by the sending-side signal processing unit 12, the sending-side signal processing unit 12 performs, for example, computation of the following equation (5):

$$EVEN_1=(B_1+A_1)/2$$

$$ODD_1=(B_1-A_1)/2 \quad \text{(Equation 5)}$$

Namely, the weight coefficient in this case is ½, and in the EVEN mode the amplitude of the data B and the amplitude of the data A are added together and a result of the addition is multiplied by ½, and in the ODD mode the amplitude of the data A is subtracted from the amplitude of the data B and a result of the subtraction is multiplied by ½. Note that A and B may be reversed.

The EVEN-mode and ODD-mode signals generated by the sending-side signal processing unit 12 are outputted to the first DA converter 13*a* and the second DA converter 13*b* (step ST14). The first DA converter 13*a* and the second DA converter 13*b* convert the EVEN-mode signal and the ODD-mode signal from digital signals to analog signals, and output the analog signals to the two signal lines 31 and 32 in the transmission path 3. Note that the first DA converter 13*a* and the second DA converter 13*b* may be reversed.

Figure 6:
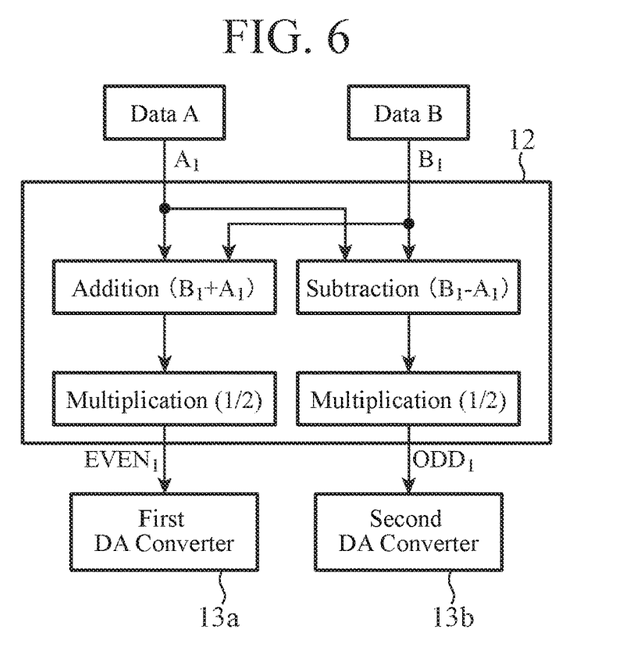
FIG. 6 is an illustrative diagram of the operation of the sending-side signal processing unit of the signal transmission apparatus according to the first embodiment of the present invention.

FIG. 6 shows the above-described operation. $A_1$ and $B_1$ are converted to $EVEN_1$ and $ODD_1$ by the sending-side signal processing unit 12, and the $EVEN_1$ and $ODD_1$ are outputted to the first DA converter 13*a* and the second DA converter 13*b*.

Figure 7:
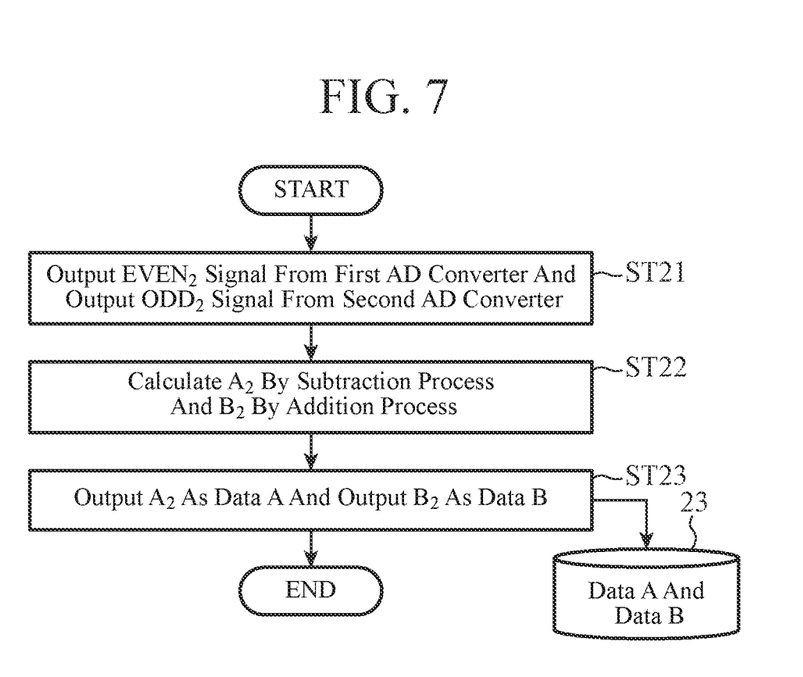
FIG. 7 is an operation flowchart of a receiving unit of the signal transmission apparatus according to the first embodiment of the present invention.

In addition, it is assumed that in the transmission path 3 crosstalk occurs between the signal line 31 and the signal line 32. It is assumed that the receiving unit 2 receives the two-channel signals $EVEN_1$ and $ODD_1$ sent through the signal line 31 and the signal line 32 in the transmission path 3, as $EVEN_2$ and $ODD_2$ signals. FIG. 7 shows an operation flowchart of the receiving unit 2.

In the receiving unit 2, the analog signals which are $EVEN_2$ (EVEN-mode signal) and $ODD_2$ (ODD-mode signal) having propagated through the two signal lines 31 and 32 in the transmission path 3 are inputted to the first AD converter 21*a* and the second AD converter 21*b*, and the first AD converter 21*a* and the second AD converter 21*b* convert the analog signals to digital data in form computable by the receiving-side signal processing unit 22, and output the digital data (step ST21). The receiving-side signal processing unit 22 performs computation shown below to reconstruct the $EVEN_2$ and $ODD_2$ being digital data to two-channel receive signals $A_2$ and $B_2$ (step ST22), and outputs $A_2$ as data A and $B_2$ as data B (step ST23).

$$A_2=EVEN_2-ODD_2$$

$$B_2=EVEN_2+ODD_2 \quad \text{(Equation 6)}$$

By the above-described equation (6), the reconstructed data $A_2$ has no component of B and the reconstructed data $B_2$ has no component of A, and thus, when disturbance noise caused by other than crosstalk (e.g., thermal noise occurring from the DA converters or the AD converters) is ignored, in the receiving unit 2 the two-channel data A and data B present in the send data storing unit 11 are completely reconstructed in terms of mathematical expressions. That is, it has been shown that in the present transmission system, signals of the data A and the data B do not interfere with each other.

Figure 8:
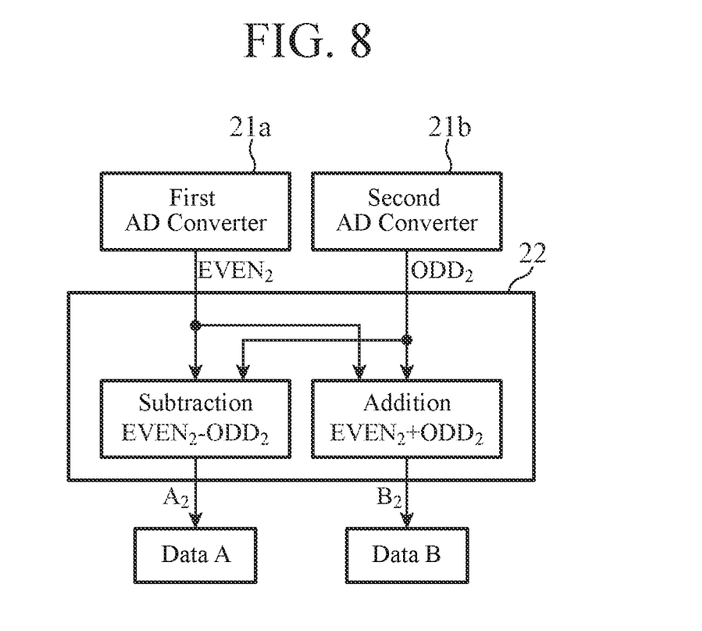
FIG. 8 is an illustrative diagram of the operation of the signal transmission apparatus according to the first embodiment of the present invention.

FIG. 8 shows the above-described operation. An EVEN-mode signal (EVEN$_2$) and an ODD-mode signal (ODD$_2$) are reconstructed to data A(A$_2$) and data B(B$_2$) by the receiving-side signal processing unit 22.

As such, the signal transmission apparatus of the present embodiment uses the orthogonality of an EVEN-mode signal and an ODD-mode signal (a property that the signals do not give crosstalk interference to each other). Hence, regardless of how narrow the space between the two signal lines 31 and 32 in the transmission path 3, there is no influence of crosstalk, and thus, signal error caused by narrowing the space between the signal lines in the transmission path 3 can be avoided, which in turn leads to an improvement in communication quality.

Figure 9A:
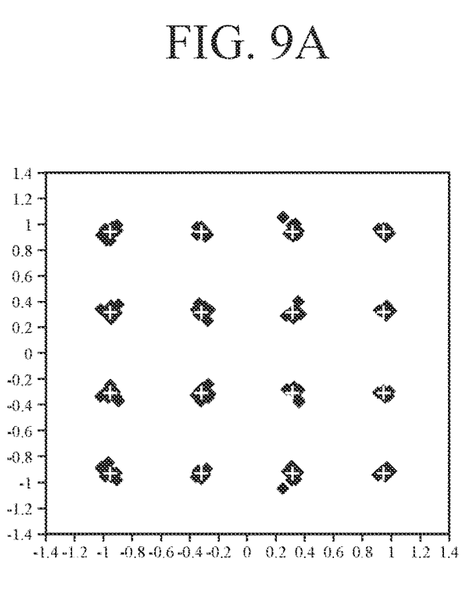
FIGS. 9A and 9B are illustrative diagrams showing, by comparison, demodulation results of the signal transmission apparatus according to the first embodiment and a conventional configuration.
Figure 9B:
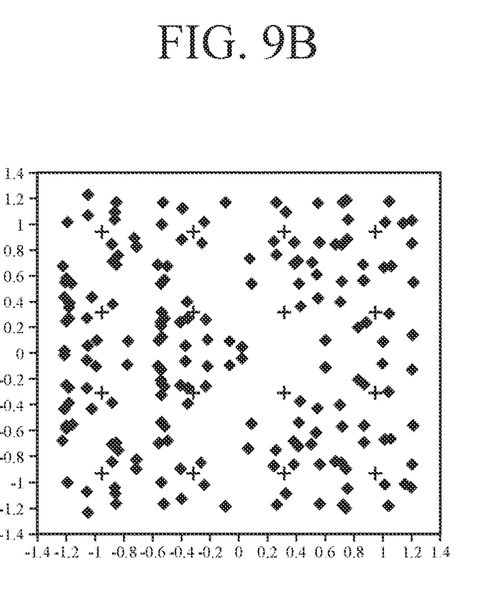

FIG. 9 shows, as an example, comparison in communication performance for a case in which the signal transmission apparatus uses 16-QAM modulation and demodulation of an OFDM system. FIG. 9A shows computation results of numerical values of a constellation of the receiving unit 2 in the first embodiment, and FIG. 9B shows results of a conventional configuration (a case in which data A and B are transmitted as they are through two transmission paths). Both cases have the same condition of crosstalk between signal lines, and in the demodulation results of the conventional configuration the constellation is greatly disordered due to signal interference, whereas in the demodulation results of the present embodiment 16 signal points can be recognized. By this, in the configuration of the present embodiment, suppression of the influence of signal interference can be confirmed. In addition, there is another advantageous effect that the apparatus is not affected by the transmission rate and the magnitude of signal amplitude.

As described above, the signal transmission apparatus of the first embodiment includes a sending unit including a sending-side signal processing unit that performs numerical value computation of data signals of a plurality of sequences, and DA converters that convert the signals outputted from the sending-side signal processing unit to analog signals, and send out the analog signals to a transmission path formed of a plurality of conductors, the number of the DA converters being equal to the number of the data signals of a plurality of sequences; and a receiving unit including AD converters that convert the signals received through the transmission path to digital signals, the number of the AD converters being equal to the number of the sequences of the data signals in the sending-side signal processing unit, and a receiving-side signal processing unit that reconstructs the data signals of a plurality of sequences from the signals outputted from the AD converters, and the sending-side signal processing unit calculates output signals using a matrix formed of eigenvectors corresponding to transmission eigenmodes in which the signals propagate through the transmission path, and the receiving-side signal processing unit calculates the data signals of a plurality of sequences by the inverse of the matrix used by the sending-side signal processing unit, and thus, the signal transmission apparatus can achieve miniaturization while maintaining quality.

Second Embodiment

A second embodiment is an example in which the transmission efficiency is improved by changing the weighting ratio between the EVEN mode and the ODD mode.

Figure 10:
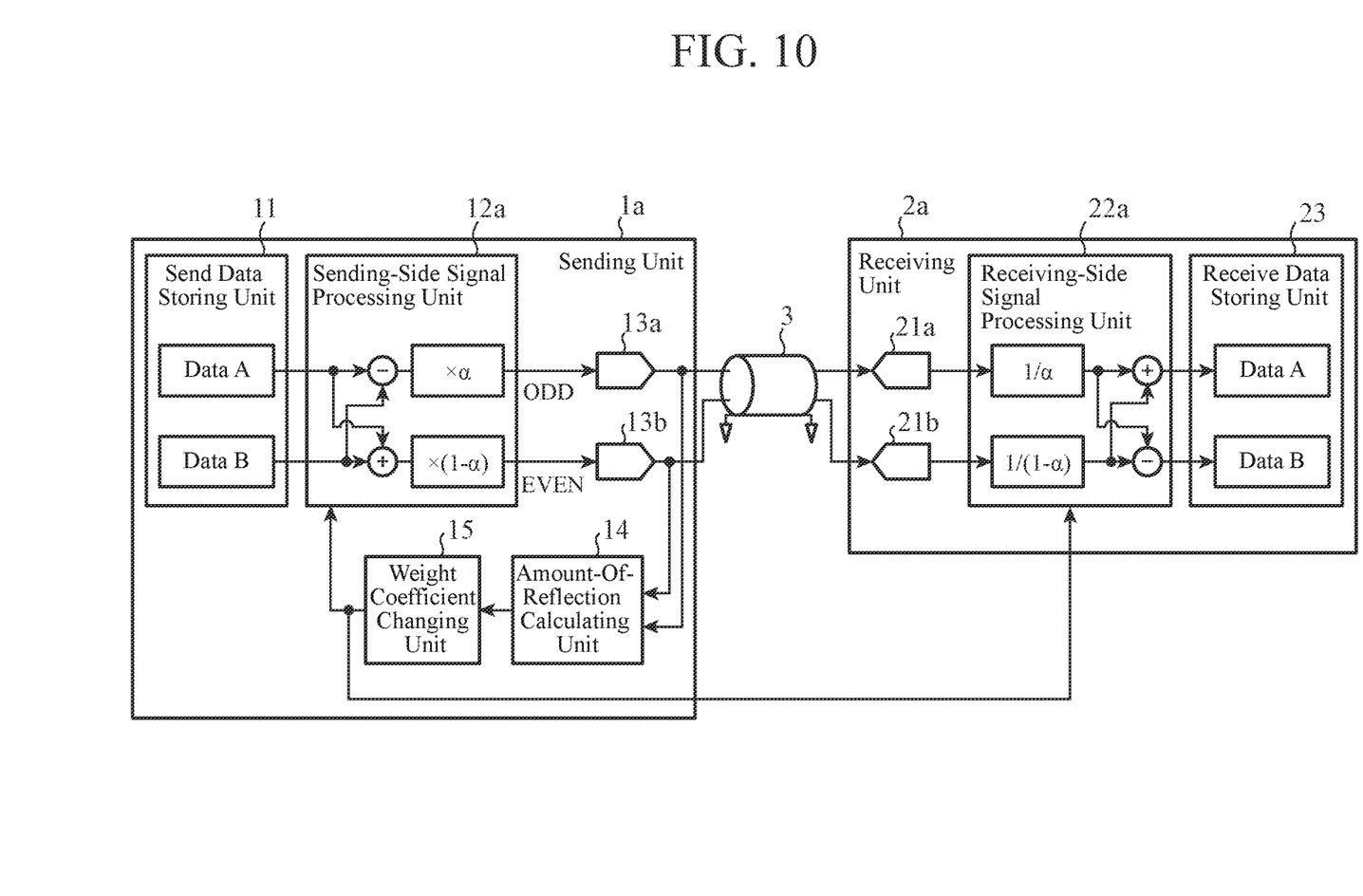
FIG. 10 is a configuration diagram of a signal transmission apparatus according to a second embodiment of the present invention.

FIG. 10 is a configuration diagram of a signal transmission apparatus of the second embodiment. The signal transmission apparatus of the second embodiment is configured such that a sending unit 1a and a receiving unit 2a are connected to each other by the transmission path 3. The sending unit 1a includes the send data storing unit 11, a sending-side signal processing unit 12a, the first DA converter 13a, the second DA converter 13b, an amount-of-reflection calculating unit 14, and a weight coefficient changing unit 15. In addition, the receiving unit 2a includes the first AD converter 21a, the second AD converter 21b, a receiving-side signal processing unit 22a, and the receive data storing unit 23.

The sending-side signal processing unit 12a in the sending unit 1a is configured to multiply a result of adding together two-sequence data signals by a weight coefficient $(1-\alpha)$ and calculate the resultant as one output data, and multiply a result of subtracting the data signals from each other by a weight coefficient $\alpha$ and calculate the resultant as the other output data. In addition, the sending-side signal processing unit 12a is configured to be capable of changing the weight coefficient $\alpha$ on the basis of an instruction to change the weight coefficient from the weight coefficient changing unit 15. The amount-of-reflection calculating unit 14 is a processing unit that detects the values of the amounts of reflection of the one output data and the other output data in the transmission path 3. The weight coefficient changing unit 15 is a processing unit that instructs the sending-side signal processing unit 12a and the receiving-side signal processing unit 22a to change the value of the weight coefficient $\alpha$ that causes the amounts of reflection detected by the amount-of-reflection calculating unit 14 to become less than or equal to a set value. In addition, the receiving-side signal processing unit 22a in the receiving unit 2a is configured to multiply the received one output data by $1/(1-\alpha)$ and multiply the other output data by $1/\alpha$, and add together the one output data and the other output data and allow the resultant to serve as one data signal (A) out of the two-sequence data signals, and subtract the one output data and the other output data from each other and allow the resultant to serve as the other data signal (B). Furthermore, the receiving-side signal processing unit 22a is configured to be capable of changing the weight coefficient $\alpha$ on the basis of an instruction to change the weight coefficient from the weight coefficient changing unit 15.

Other configurations are the same as those of the first embodiment shown in FIG. 1 and thus corresponding portions are denoted by the same reference signs and description thereof is omitted.

The hardware configurations of the amount-of-reflection calculating unit 14 and the weight coefficient changing unit 15 can also be implemented by an FPGA, etc., as with the hardware configurations of the sending-side signal processing unit 12a and the receiving-side signal processing unit 22a, or may be the hardware configuration shown in FIG. 2.

Next, the operation of the signal transmission apparatus of the second embodiment will be described.

The sending-side signal processing unit 12a of the second embodiment performs a process shown below on two-channel data A and data B stored in the send data storing unit 11. Namely, one output data is EVEN and the other output data is ODD.

$$EVEN = (1-\alpha) \times (A+B)$$

$$ODD = \alpha \times (B-A) \qquad \text{(Equation 7)}$$

Here, $\alpha$ is the weight coefficient between the modes and is determined by the state of the transmission path 3 by a technique shown below. The process of equation (7) is the same as that of the flowchart shown in FIG. 5, and differs from the first embodiment in that the weight coefficients are changed from ½ to α and (1−α).

In addition, in the second embodiment, the amount-of-reflection calculating unit 14 calculates the value of a reflection mismatch in the transmission path 3. The amount-of-reflection calculating unit 14 finds, for example, the amounts of reflection Sdd11 and Scc11. Since the amount-of-reflection calculating unit 14 can know output voltage values from the first DA converter 13a and the second DA converter 13b, by, for example, measuring the voltage values of the first DA converter 13a and the second DA converter 13b and a voltage value on the transmission path 3 using an AD converter such as that also used in the first AD converter 21a and the second AD converter 21b, the amount-of-reflection calculating unit 14 can find the amounts of reflection from the voltage values measured by the AD converters and the output voltage values from the DA converters.

For example, for the ODD-mode and EVEN-mode data outputted from the first DA converter 13a and the second DA converter 13b in the sending unit 1a, when the characteristic impedances of signal lines in the sending unit 1a differ from the characteristic impedances of the signal line 31 and the signal line 32 in the transmission path 3, the signals are reflected at an entrance portion of the transmission path 3. In addition, due to the same reason, signal reflection also occurs at a portion between the transmission path 3 and the receiving unit 2a. The amount of the reflection is generally represented as Sdd11 in the ODD mode and as Scc11 in the EVEN mode, and a larger amount of the reflection (signal level=amplitude) leads to lower transmission efficiency. Hence, the amount-of-reflection calculating unit 14 finds the magnitudes (amplitudes or electric power) of Sdd11 and Scc11.

Figure 11:
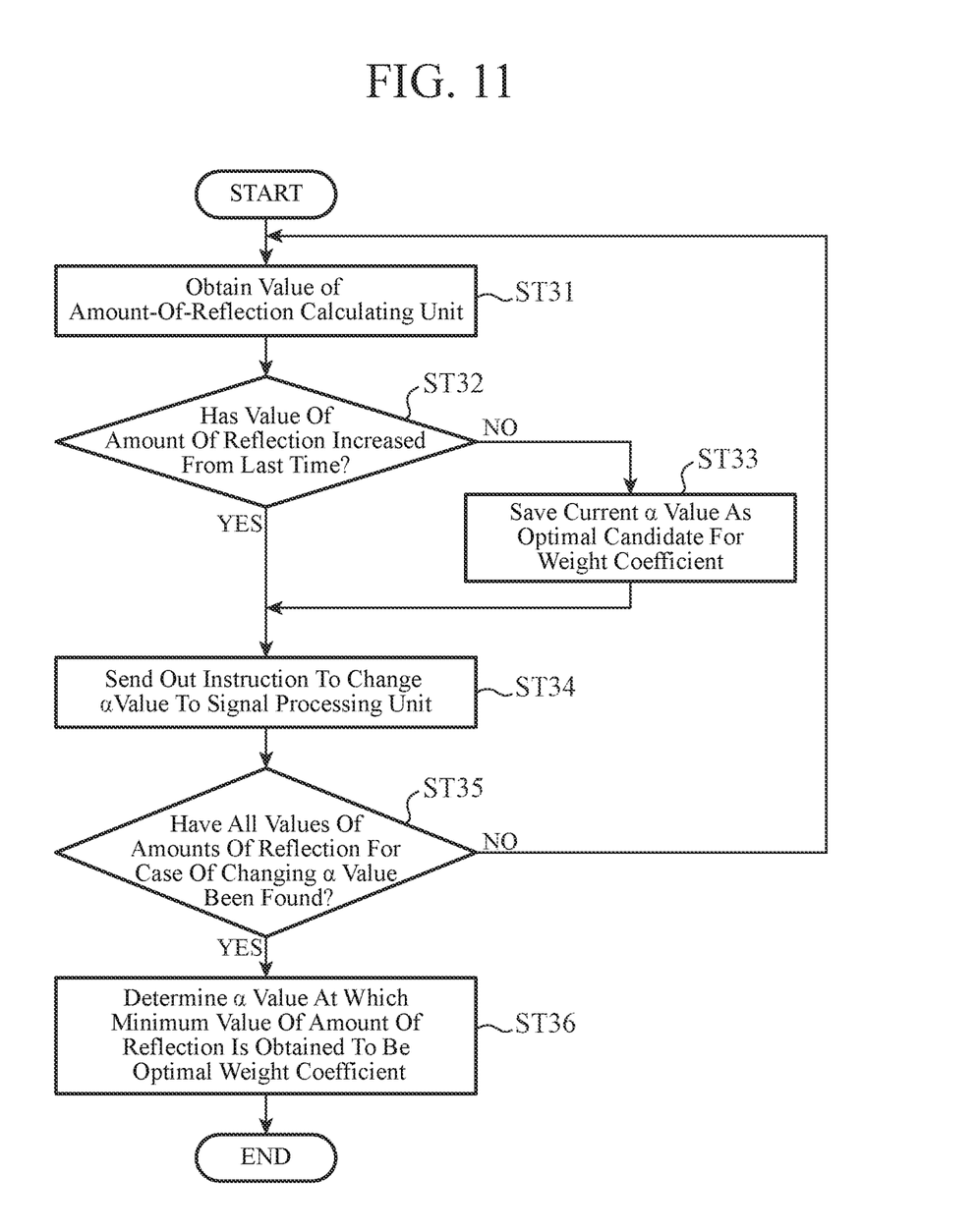
FIG. 11 is an operation flowchart of a weight coefficient changing unit of the signal transmission apparatus according to the second embodiment of the present invention.

Next, the operation of the weight coefficient changing unit 15 will be described using a flowchart of FIG. 11.

First, the weight coefficient changing unit 15 obtains a value of the amount-of-reflection calculating unit 14 (step ST31). Then, the obtained value is compared with a value obtained last time, and if the value has increased from the last time, processing transitions to step ST34, and transitions to step ST33 otherwise (step ST32). Note that when a value obtained last time is not present due to the first control, etc., a default value is used, or after obtaining a value obtained last time, a comparison process is performed. At step ST33, the current α value is saved as an optimal candidate for the weight coefficient, and at step ST34, an instruction to change the α value is provided to the sending-side signal processing unit 12a. Note that the α value is in a range of 0<α<1. The sending-side signal processing unit 12a changes the α value on the basis of the instruction to change the α value from the weight coefficient changing unit 15 at step ST34. Then, the weight coefficient changing unit 15 determines whether all values of the amounts of reflection for a case of changing the α value have been found (step ST35), and performs processes from step ST31 until all values of the amounts of reflection based on the change in a value have been found. If it is determined at step ST35 that all values of the amounts of reflection have been found, an α value at which the minimum value of the amount of reflection is obtained is determined to be an optimal weight coefficient (step ST36).

For the operation of the receiving unit 2a, the receiving-side signal processing unit 22a performs an inverse process to that of equation (7), and reconstructs the data A and the data B by changing the α value on the basis of an instruction to change the α value from the weight coefficient changing unit 15.

In the present embodiment, on the basis of the computation values of Sdd11 and Scc11, the weight coefficient changing unit 15 optimally sets the value of the weight coefficient α on the basis of the characteristics of the transmission path 3, and thus, an advantageous effect of an improvement in transmission efficiency can be obtained.

As described above, according to the signal transmission apparatus of the second embodiment, the sending-side signal processing unit multiplies a result of adding together two-sequence data signals by a weight coefficient (1−α) and calculates the resultant as one output data, and multiplies a result of subtracting the data signals from each other by a weight coefficient α and calculates the resultant as the other output data, and the receiving-side signal processing unit multiplies the received one output data by 1/(1−α) and multiplies the other output data by 1/α, and adds together the one output data and the other output data and allows the resultant to serve as one data signal out of the two-sequence data signals, and subtracts the one output data and the other output data from each other and allows the resultant to serve as the other data signal, and thus, the weight coefficient can be set to an arbitrary value in addition to the advantageous effect of the first embodiment.

In addition, since the signal transmission apparatus of the second embodiment includes: an amount-of-reflection calculating unit that detects the values of the amounts of reflection of the one output data and the other output data in the transmission path; and a weight coefficient changing unit that instructs the sending-side signal processing unit and the receiving-side signal processing unit to change the value of the weight coefficient α that causes the amounts of reflection to become less than or equal to a set value, the transmission efficiency can be improved in addition to the advantageous effect of the first embodiment.

Third Embodiment

A third embodiment is an example in which the weighting ratio between the EVEN mode and the ODD mode is changed on the basis of reception success rates.

Figure 12:
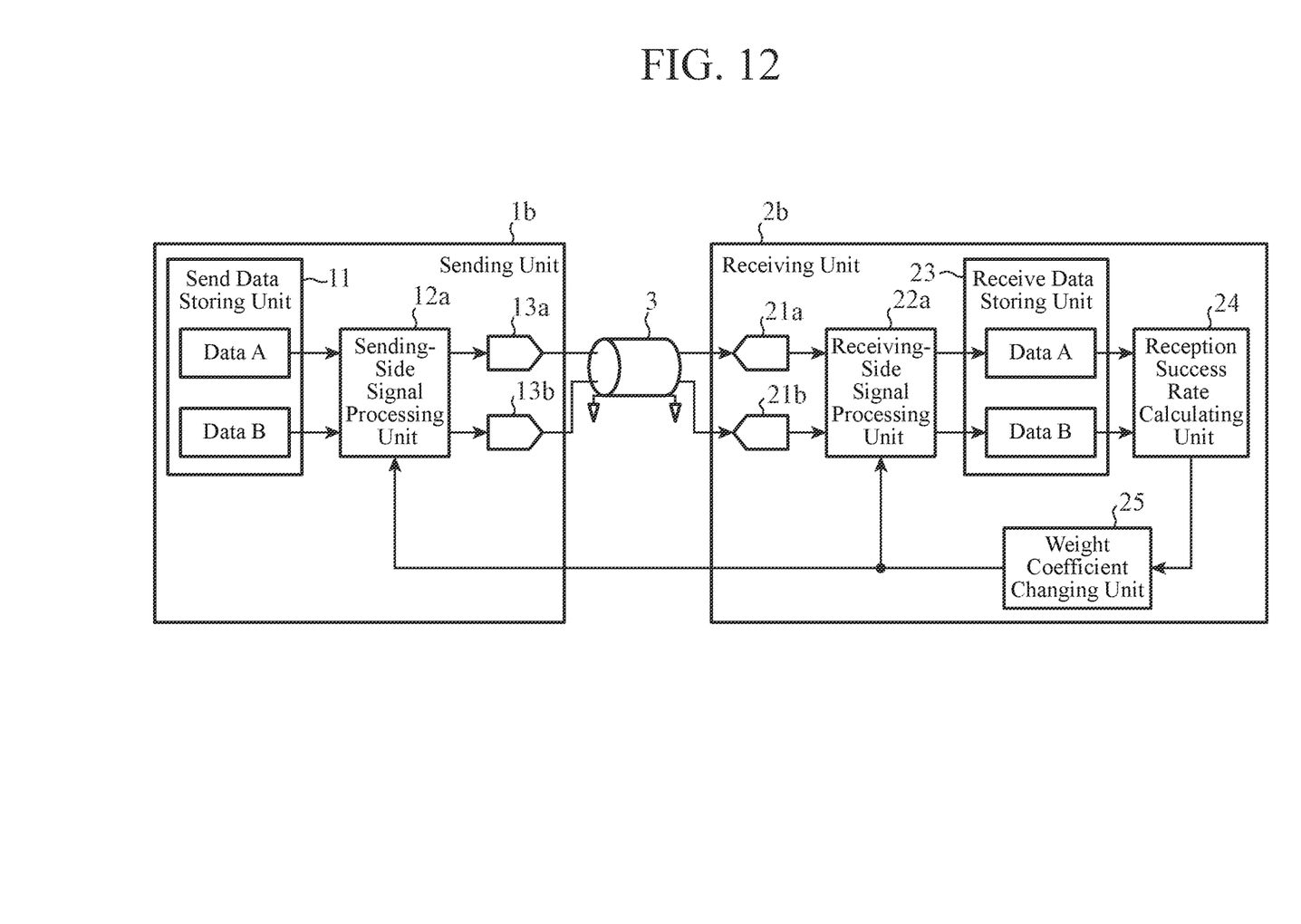
FIG. 12 is a configuration diagram of a signal transmission apparatus according to a third embodiment of the present invention.

FIG. 12 is a configuration diagram of a signal transmission apparatus of the third embodiment. A receiving unit 2b of the third embodiment includes a reception success rate calculating unit 24 and a weight coefficient changing unit 25. The reception success rate calculating unit 24 is a processing unit that calculates reception success rates by comparing data signals sent from a sending unit 1b with data signals received by the receiving unit 2b. The weight coefficient changing unit 25 is a processing unit that instructs the sending-side signal processing unit 12a and the receiving-side signal processing unit 22a to change the value of a weight coefficient that causes the reception success rates calculated by the reception success rate calculating unit 24 to become greater than or equal to a set value. Other configurations are the same as those of the first embodiment shown in FIG. 1 except that the sending-side signal processing unit 12a in the sending unit 1b and the receiving-side signal processing unit 22a in the receiving unit 2b change the weight coefficient α in accordance with a change instruction from the weight coefficient changing unit 25, and thus, corresponding portions are denoted by the same reference signs and description thereof is omitted.

The hardware configurations of the reception success rate calculating unit 24 and the weight coefficient changing unit 25 can also be implemented by an FPGA, etc., as with the hardware configurations of the sending-side signal processing unit 12a and the receiving-side signal processing unit 22a, or may be the hardware configuration shown in FIG. 2.

Next, the operation of the signal transmission apparatus of the third embodiment will be described.

In the signal transmission apparatus of the third embodiment, known test data (which may be called training data) is sent to the receiving unit 2b as data $A(A_1)$ and data $B(B_1)$ in the send data storing unit 11, and the reception success rate calculating unit 24 calculates, as reception success rates, how much data $A(A_2)$ and data $B(B_2)$ in the receive data storing unit 23 in the receiving unit 2b match the data $A(A_1)$ and data $B(B_1)$ in the send data storing unit 11. Alternatively, as means for calculating reception success rates in the reception success rate calculating unit 24, Bit Error Rates (BERs) of the receive data $A(A_2)$ and receive data $B(B_2)$ in the receive data storing unit 23 may be used. Here, the reception success rate being high and the BER being close to zero have the same meaning.

Figure 13:
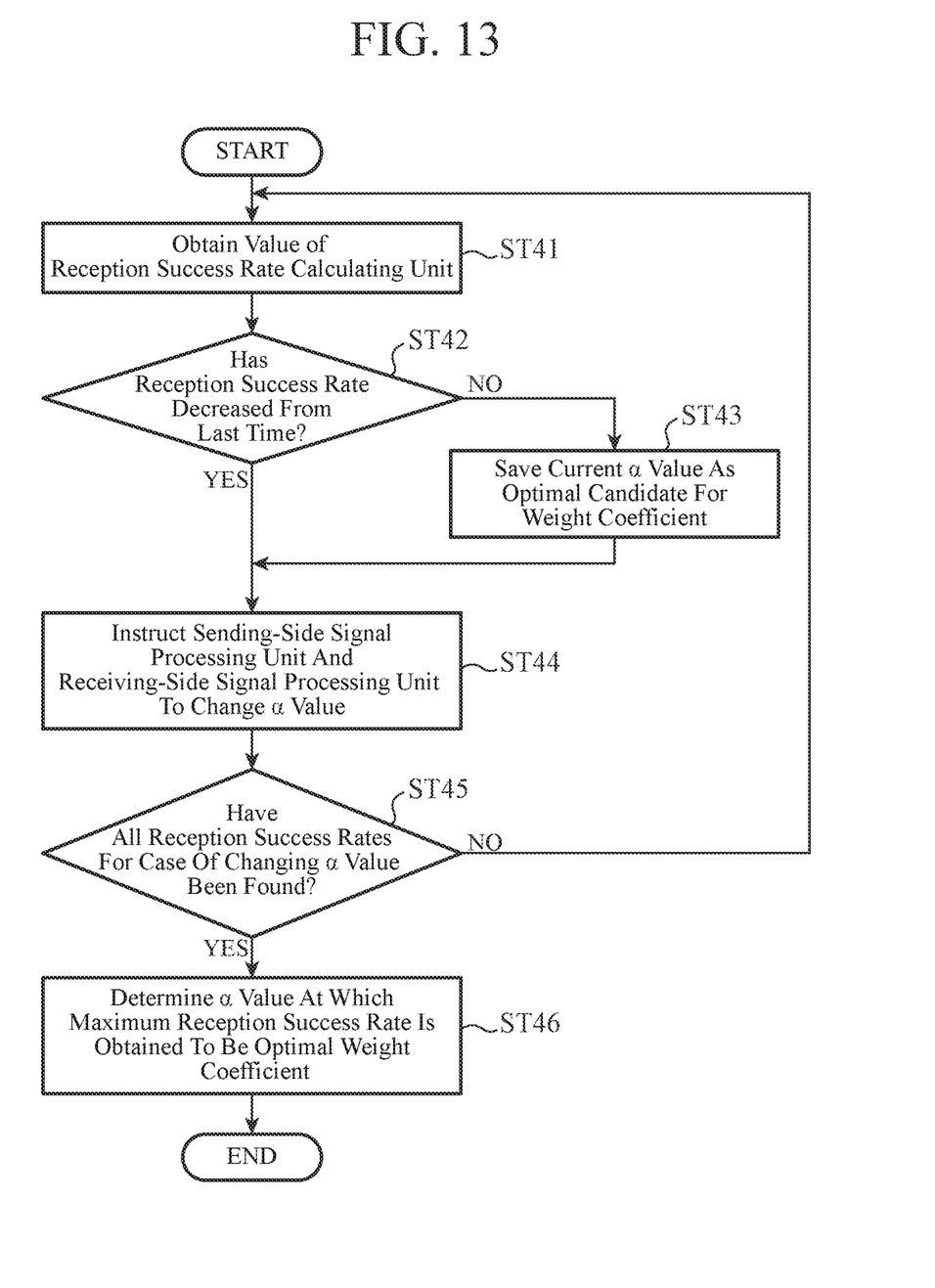
FIG. 13 is an operation flowchart of a weight coefficient changing unit of the signal transmission apparatus according to the third embodiment of the present invention.

Next, the operation of the weight coefficient changing unit 25 will be described using a flowchart of FIG. 13.

First, the weight coefficient changing unit 25 obtains a value of the reception success rate calculating unit 24 (step ST41). Then, the obtained value is compared with a value obtained last time, and if the value has decreased from the last time, processing transitions to step ST44, and transitions to step ST43 otherwise (step ST42). Note that when a value obtained last time is not present due to the first control, etc., a default value is used, or after obtaining a value obtained last time, a comparison process is performed. At step ST43, the current a value is saved as an optimal candidate for the weight coefficient, and at step ST44, an instruction to change the $\alpha$ value is provided to the sending-side signal processing unit 12a and the receiving-side signal processing unit 22a. Note that the $\alpha$ value is in a range of $0<\alpha<1$. The sending-side signal processing unit 12a and the receiving-side signal processing unit 22a change the $\alpha$ value on the basis of the instruction to change the $\alpha$ value from the weight coefficient changing unit 25 at step ST44. The weight coefficient changing unit 25 determines whether all values of reception success rates for a case of changing the $\alpha$ value have been found (step ST45), and performs processes from step ST41 until all values of reception success rates based on the change in a value have been found. If it is determined at step ST45 that all values of reception success rates have been found, an a value at which the maximum value of a reception success rate is obtained is determined to be an optimal weight coefficient (step ST46). Namely, this is because it can be said that a higher value (closer to 100%) of a reception success rate is more desirable.

The value of the weight coefficient $\alpha$ determined in this manner is shared by the sending-side signal processing unit 12a and the receiving-side signal processing unit 22a in a phase such as an initialization process of the signal transmission apparatus.

As described above, since the signal transmission apparatus of the third embodiment includes: a reception success rate calculating unit that calculates reception success rates by comparing data signals sent from the sending unit with data signals received by the receiving unit; and a weight coefficient changing unit that instructs the sending-side signal processing unit and the receiving-side signal processing unit to change the value of a weight coefficient that causes the reception success rates calculated by the reception success rate calculating unit to become greater than or equal to a set value, the transmission efficiency can be improved in addition to the advantageous effect of the first embodiment.

Fourth Embodiment

A fourth embodiment is an example in which the weighting ratio between the EVEN mode and the ODD mode is changed on the basis of the pass characteristics of the transmission path 3.

Figure 14:
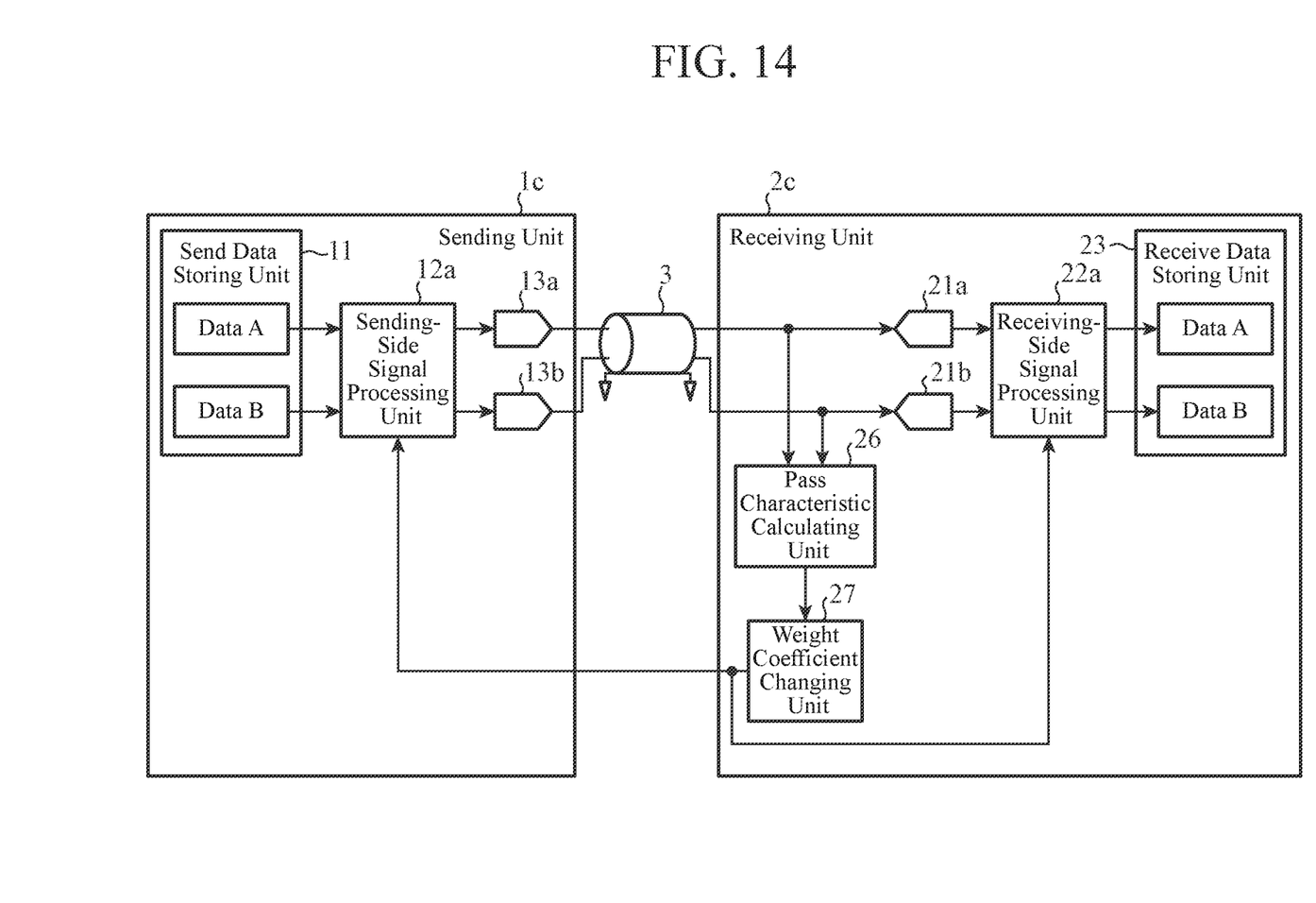
FIG. 14 is a configuration diagram of a signal transmission apparatus according to a fourth embodiment of the present invention.

FIG. 14 is a configuration diagram of a signal transmission apparatus of the fourth embodiment. A receiving unit 2c of the fourth embodiment includes a pass characteristic calculating unit 26 and a weight coefficient changing unit 27. The pass characteristic calculating unit 26 is a processing unit that detects the pass characteristics of one output data and the other output data in the transmission path 3. The weight coefficient changing unit 27 is a processing unit that instructs the sending-side signal processing unit 12a and the receiving-side signal processing unit 22a to change the value of the weight coefficient $\alpha$ that causes the pass characteristics calculated by the pass characteristic calculating unit 26 to become greater than or equal to a set value. Other configurations are the same as those of the first embodiment shown in FIG. 1 except that the sending-side signal processing unit 12a in a sending unit 1c and the receiving-side signal processing unit 22a in the receiving unit 2c change the weight coefficient $\alpha$ in accordance with a change instruction from the weight coefficient changing unit 27, and thus, corresponding portions are denoted by the same reference signs and description thereof is omitted.

The hardware configurations of the pass characteristic calculating unit 26 and the weight coefficient changing unit 27 can also be implemented by an FPGA, etc., as with the hardware configurations of the sending-side signal processing unit 12a and the receiving-side signal processing unit 22a, or may be the hardware configuration shown in FIG. 2.

Next, the operation of the signal transmission apparatus of the fourth embodiment will be described.

In the signal transmission apparatus of the fourth embodiment, known test data (which may be called training data) is sent to the receiving unit 2c as data A and data B in the send data storing unit 11, and the pass characteristic calculating unit 26 in the receiving unit 2c finds the magnitudes (amplitudes or electric power) of pass characteristics Sdd21 and Scc21 of EVEN-mode data and ODD-mode data that have passed through the transmission path 3. Here, a difference from the amount-of-reflection calculating unit 14 of the second embodiment is that while in the second embodiment voltages between outputs from the first DA converter 13a and the second DA converter 13b in the sending unit 1a and the transmission path 3 are measured, in the fourth embodiment voltages between the transmission path 3 and inputs to the first AD converter 21a and the second AD converter 21b are measured in the receiving unit 2c.

Figure 15:
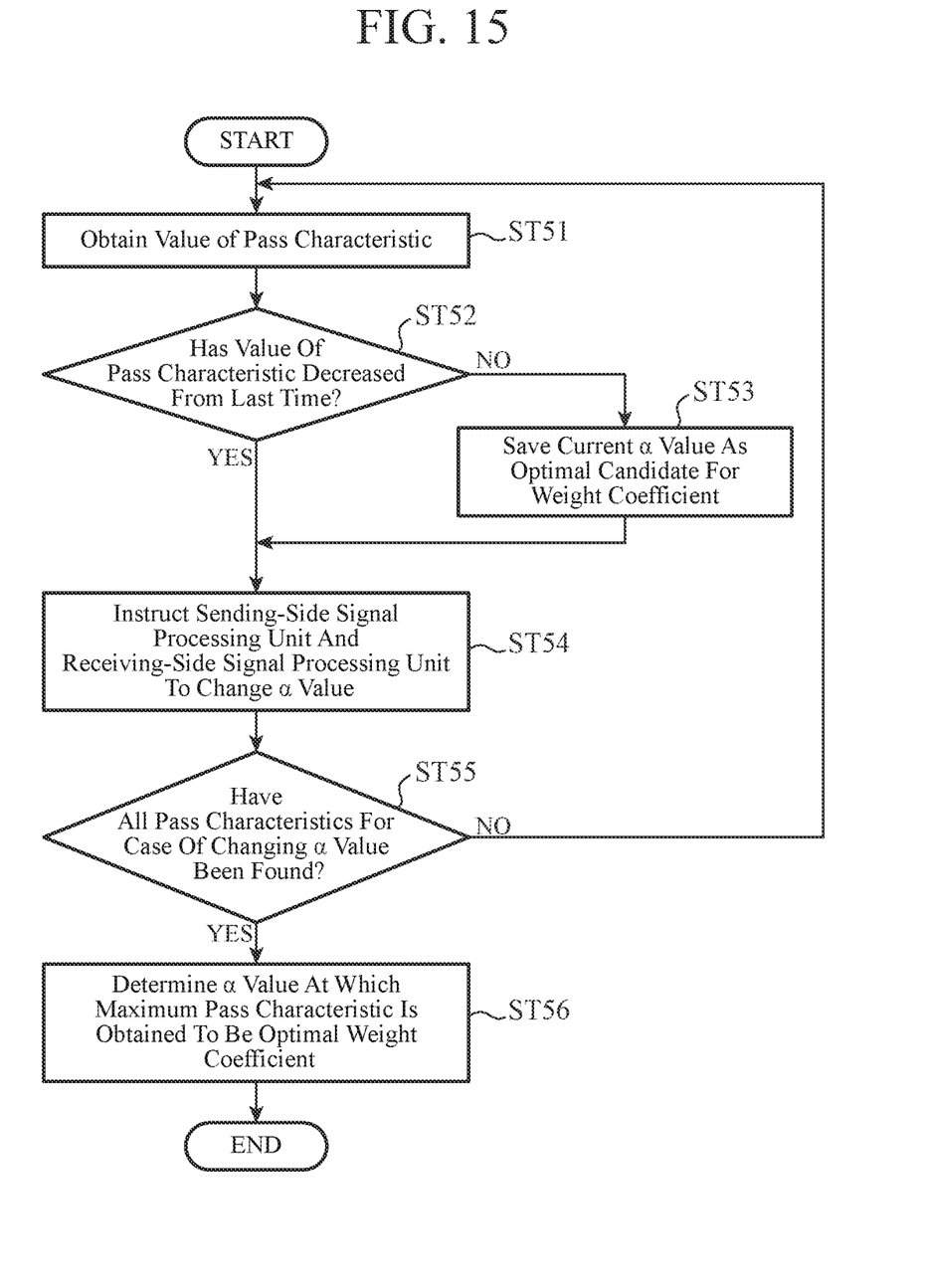
FIG. 15 is an operation flowchart of a weight coefficient changing unit of the signal transmission apparatus according to the fourth embodiment of the present invention.

Next, the operation of the weight coefficient changing unit 27 will be described using a flowchart of FIG. 15.

First, the weight coefficient changing unit 27 obtains a value of the pass characteristic calculating unit 26 (step ST51). Then, the obtained value is compared with a value obtained last time, and if the value has decreased from the last time, processing transitions to step ST54, and transitions to step ST53 otherwise (step ST52). Note that when a value obtained last time is not present due to the first control, etc., a default value is used, or after obtaining a value obtained last time, a comparison process is performed. At step ST53, the current a value is saved as an optimal candidate for the weight coefficient, and at step ST54, an instruction to change the $\alpha$ value is provided to the sending-side signal processing unit 12a and the receiving-side signal processing unit 22a. Note that the $\alpha$ value is in a range of $0<\alpha<1$. The sending-side signal processing unit 12a and the receiving-side signal processing unit 22a change the α value on the basis of the instruction to change the α value from the weight coefficient changing unit 27 at step ST54. The weight coefficient changing unit 27 determines whether all pass characteristics for a case of changing the α value have been found (step ST55), and performs processes from step ST51 until all pass characteristics based on the change in a value have been found. If it is determined at step ST55 that all pass characteristics have been found, an a value at which the maximum pass characteristic is obtained is determined to be an optimal weight coefficient (step ST56). Namely, this is because it can be said that a higher value of a pass characteristic (closer to 100%) is more desirable.

The value of the weight coefficient α determined in this manner is shared by the sending-side signal processing unit 12a and the receiving-side signal processing unit 22a in a phase such as an initialization process of the signal transmission apparatus.

As described above, since the signal transmission apparatus of the fourth embodiment includes: a pass characteristic calculating unit that detects pass characteristics of one output data and the other output data in the transmission path; and a weight coefficient changing unit that instructs the sending-side signal processing unit and the receiving-side signal processing unit to change the value of the weight coefficient α that causes the pass characteristics to become greater than or equal to a set value, the transmission efficiency can be improved in addition to the advantageous effect of the first embodiment.

Note that in the invention of the present application, a free combination of the embodiments, modifications to any component of the embodiments, or omissions of any component in the embodiments are possible within the scope of the invention.

INDUSTRIAL APPLICABILITY

As described above, signal transmission apparatuses according to the present invention are related to a configuration that can suppress the occurrence of signal interference caused by crosstalk between adjacent signal wiring lines, and are suitable for use as apparatuses that perform high-speed metal line signal transmission using a printed circuit board, a cable, etc.

REFERENCE SIGNS LIST 1, 1a, 1b, 1c: Sending unit, 2, 2a, 2b, 2c: Receiving unit, 3: Transmission path, 11: Send data storing unit, 12, 12a: Sending-side signal processing unit, 13a: First DA converter, 13b: Second DA converter, 14: Amount-of-reflection calculating unit, 15, 25, 27: Weight coefficient changing unit, 21a: First AD converter, 21b: Second AD converter, 22, 22a: Receiving-side signal processing unit, 23: Receive data storing unit, 24: Reception success rate calculating unit, 26: Pass characteristic calculating unit, and 31, 32: Signal line

The invention claimed is:

1. A signal transmission apparatus comprising:
a sender including a processor to execute a program; and a memory to store the program which, when executed by the processor, performs processes of performing numerical value computation of data signals of a plurality of sequences; and DA converters to convert the signals outputted from the processor to analog signals and to send out the analog signals to a transmission path formed of a plurality of conductors, the number of the DA converters being equal to the number of the data signals of the plurality of sequences; and
a receiver including AD converters to convert the signals received through the transmission path to digital signals, the number of the AD converters being equal to the number of the data signals of the plurality of sequences in the sender; a processor to execute a program; and a memory to store the program which, when executed by the processor, performs processes of reconstructing the data signals of the plurality of sequences from the signals outputted from the AD converters, wherein
the processor of the sender is configured to calculate output signals using a matrix formed of eigenvectors corresponding to transmission eigenmodes in which the signals propagate through the transmission path, and the processor of the receiver is configured to calculate the data signals of the plurality of sequences by inverse of the matrix used by the processor of the sender,
the processor of the sender is configured to multiply a result of adding together two-sequence data signals by a weight coefficient $(1-\alpha)$ and allow a resultant as one output data, and to multiply a result of subtracting the data signals from each other by a weight coefficient α and allow a resultant as other output data, and
the processor of the receiver is configured to multiply the received one output data by a weight coefficient $1/(1-\alpha)$ and multiply the other output data by a weight coefficient $1/\alpha$, and to add together the one output data and the other output data and allows a resultant to serve as one data signal out of the two-sequence data signals, and to subtract the one output data and the other output data from each other and allow a resultant to serve as an other data signal.

2. The signal transmission apparatus according to claim 1, wherein
the processor of the sender is configured to detect values of amounts of reflection of the one output data and the other output data in the transmission path; and
the processor of the sender and the processor of the receiver are configured to change a value of the weight coefficient α that causes the amounts of reflection to become less than or equal to a set value.

3. The signal transmission apparatus according to claim 1, wherein
the processor of the receiver is configured to calculate success rates of receive data by comparing the data signals sent from the sending unit with the data signals received by the receiving unit; and
the processor of the sender and the processor of the receiver are configured to change a value of the weight coefficient α that causes the reception success rates calculated by the reception success rate calculating unit to become greater than or equal to a set value.

4. The signal transmission apparatus according to claim 1, wherein
the processor of the receiver is configured to detect pass characteristics of the one output data and the other output data in the transmission path; and
the processor of the sender and the processor of the receiver are configured to change a value of the weight coefficient α that causes the pass characteristics to become greater than or equal to a set value.

* * * * *